March 29, 1966
R. F. O'BRIEN
3,243,795
BATTERY CONDITION INDICATOR
Filed March 8, 1963
*Fig. 1*
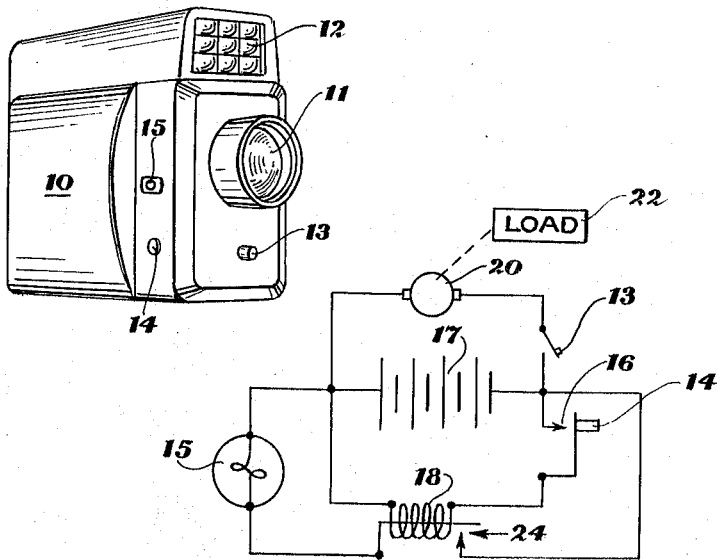
*Fig. 2*
*Fig. 3*
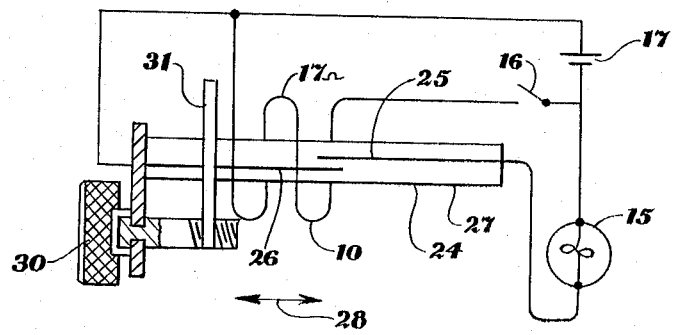
Robert F. O'Brien
INVENTOR.
BY R. Frank Smith
David P. Ogden
ATTORNEYS

United States Patent Office 3,243,795
Patented Mar. 29, 1966

3,243,795
BATTERY CONDITION INDICATOR
Robert F. O'Brien, Rochester, N.Y., assignor to Eastman Kodak Company, Rochester, N.Y., a corporation of New Jersey
Filed Mar. 8, 1963, Ser. No. 263,793
4 Claims. (Cl. 340—249)

This invention relates to a battery condition indicator and, more particularly, to an indicator arrangement for determining the voltage of a battery pack under load conditions equivalent to normal usage load conditions.

Many battery condition indicators are known wherein the peak voltage of a battery is determined without determination of the power capacity of the battery such as its voltage under load current conditions. Also battery condition checkers are available utilizing various meter and shunt arrangements for determining the condition of a battery under load. However, these battery checkers do not specifically measure the current flow and are generally heavyweight, expensive equipments not suitable for use in many applications. For instance, a battery and heavy checker would not be most useful in applications where the battery, its load, and its checker would normally be carried by hand, as in the case of a battery-powered camera.

Therefore, an object of my invention is to provide a simple and reliable battery condition indicator.

In accordance with one embodiment of my invention, a battery is intermittently couplable to energize a solenoid with the solenoid arranged to draw current equivalent to that used by the load arrangement normally placed across the battery. The solenoid, only if conducting a predetermined minimum magnitude of current, energizes a switch magnetically coupled thereto to couple an indicator lamp in circuit with the battery.

The subject matter which is regarded as my invention is particularly pointed out and distinctly claimed in the concluding portion of this specification. The invention, however, as to its organization and operation together with further objects and advantages thereof, will best be understood by reference to the following description taken in connection with the accompanying drawing in which:

FIG. 1 is a perspective view of a camera arranged to utilize the present invention;

FIG. 2 is a schematic circuit diagram of the present invention; and

FIG. 3 is a detail view of portions of the schematic diagram shown in FIG. 2.

Referring now to the drawing wherein like numbers refer to similar parts, I have shown in FIG. 1 a movie camera 10, having a lens system 11, a viewfinder 12, and a start button 13. At such times as the operator of the camera 10 wishes to photograph subjects viewed through the viewfinder 12, he presses the start button 13 to energize a motor and operate the film take-up mechanism and a shutter mechanism (not shown) co-operating with the lens system 11.

Periodically, to assure that a power supply is in condition to properly operate the motor-driven film, a test button 14 is depressed. If a test or indicator lamp 15 glows, there is sufficient voltage to continue taking pictures with the system operating at the required speed. Because of the use of a battery power supply, I prefer to use a low wattage test lamp 15. An indicator lamp suitable for such is marketed by General Electric as #2114, and will draw up to 60 milliamps in this type of usage.

Referring now to FIG. 2, the test button 14 closes a switch contact arrangement 16 to couple a battery pack 17 in circuit with a solenoid 18. The solenoid 18 is constructed to provide an impedance equivalent to that of the usual battery load arrangement of the system, including a motor 20 when coupled by the start button 13 to drive a load 22 which may be the film take-up reel and shutter mechanism discussed above in connection with FIG. 1. When operating in a normal and proper manner, the load arrangement has a predetermined known impedance and operates at a preselected speed. Since the speed of many electric driven motor and load arrangements, including the one specified here, is critical, the minimum wattage available is also critical.

Using a test circuit having an impedance similar to that of a known load arrangement results in a check of not only a battery's voltage and current capacity, but also of its effective internal resistance and like characteristics. At such time as the current passing through the solenoid 18 is equal to that necessary for properly operating the motor 20 under load, the solenoid is so arranged that its magnetic flux will be sufficient to close a magnetic switch arrangement 24. Closing of the switch 24 couples the indicator lamp 15 across the battery pack 17. Such energization of the indicator lamp 15 provides signal information that the battery pack 17 is in proper condition to operate the motor 20 to drive the load 22. In a particular environment of the present invention, the motor will draw ¼ ampere when operating the load 22 at required speeds and supplied with 4¼ volts by four double A battery cells coupled in series to form the battery pack 17. Obviously, other battery pack arrangements are usable with the particular load arrangement specified herein. However, the operation is satisfactory when the battery pack 17 provides about 75% of its rated voltage to the loaded motor 20.

Referring now to FIG. 3, the method of operation of the solenoid 18 and the magnetic switch 24 is illustrated in greater detail with the solenoid 18 having a sufficient number of turns to provide approximately 17 ohms impedance to direct current supplied by the battery pack 17. When using a ⅜" diameter solenoid having approximately 700 turns of 3 mil wire, the solenoid 18 will draw 250 milliamps or ¼ ampere at room temperature when the battery voltage is as low as 4.25 volts. The flux generated by such a coil when drawing ¼ ampere is slightly more than enough to operate coaxial "reeds" 25 and 26 of the magnetic reed switch 24 marketed as MR 400 by the Gordos Corporation. Magnetic reed switches are usually made with the reeds 25 and 26 enclosed in an evacuated tube 27 whereby the arcing thereof is substantially inhibited. To properly adjust the effect of the magnetic flux, the position of the solenoid 18 is varied along the magnetic reed switch 24 as indicated by a double ended arrow 28 until the preselected minimum ampere-turns (700 x .25) is just sufficient to develop a contact between the reeds 25 and 26. Using magnetic flux to operate the reeds results in a modified snap action because the flux is increasingly effective as the reeds come closer together.

This adjustment may be accomplished in a fixture whereupon the solenoid 18 is secured to the magnetic reed switch 24 by a non-magnetic glue. However, for explanatory purposes, I have shown a knurled bolt 30 rotatably secured to the switch 24 and drivingly coupled to a core flange 31 of the solenoid 18.

With the particular solenoid and switch set forth above, the solenoid 18 is placed approximately as shown in FIG. 3. That is, one end of the solenoid 18 is approximately aligned with the central gap between the reeds 25 and 26. However, because of manufacturing tolerances, such a coil may be moved as much as ⅛" toward or away from the center of the magnetic reed switch 24 to obtain desired adjustment of the present invention.

While I have shown and described particular embodiments of the present invention, other modifications may occur to those skilled in this art. I intended, therefore, to have the appended claims cover all modifications which fall within the true spirit and scope of my invention.

I claim:
1. A battery condition indicator for determining the power available from a battery pack for selectively operating a predetermined load arrangement comprising:
   a solenoid having an impedance substantially equal to that of the load arrangement whereby the voltage drop of the battery pack when coupled to either the load arrangement or said solenoid will be substantially the same;
   an indicator lamp;
   magnetic switch means within the magnetic field of said solenoid and in circuit with said lamp;
   means for determining the location of said solenoid relative to said switch so that current flow through said solenoid substantially equal to or greater than current flow necessary to properly operate the load arrangement will energize said lamp to provide an indication of acceptable battery condition; and
   switch means for temporarily coupling said solenoid across the battery pack.

2. A battery condition indicator for determining the power available from a battery pack for selectively operating a predetermined load arrangement comprising:
   a solenoid having an impedance substantially equal to that of the load arrangement whereby the voltage drop of the battery pack when coupled to either the load arrangement or said solenoid will be substantially the same;
   a test switch operable to couple said solenoid across the battery pack;
   a magnetic reed switch coaxial with said solenoid;
   an indicator lamp connected to be energized from the battery pack by said magnetic reed switch; and
   means for establishing the longitudinal location of said solenoid relative to said magnetic reed switch so that current flow through said solenoid substantially equal to or greater than current flow necessary to properly operate the load arrangement will operate said magnetic reed switch to energize said lamp and provide an indication of acceptable battery condition.

3. A battery condition indicator for determining the power available from a battery pack comprising:
   a load having predetermined impedance when operating in a normal manner;
   a start switch to energize said load arrangement from the battery pack;
   a solenoid having an impedance substantially equal to that of said load whereby the current drain and the voltage drop of the battery pack when coupled to either said load or said solenoid will be substantially the same;
   a test switch operable to couple said solenoid across the battery pack;
   a magnetic reed switch coaxial with said solenoid;
   an indicator lamp connected to be energized from the battery pack by said magnetic reed switch; and
   means for establishing the longitudinal location of said solenoid relative to said magnetic reed switch so that current flow through said solenoid substantially equal to or greater than current flow necessary to properly operate said load will operate said magnetic reed switch to energize said lamp to provide an indication of acceptable battery condition.

4. A battery condition indicator for determining the power available from a battery pack comprising:
   a load arrangement having predetermined impedance when operating in a normal manner and arranged to operate normally at voltages greater than about 75% of the battery pack rated voltage;
   a start switch arranged to energize said load arrangement from the battery pack;
   a solenoid having an impedance substantially equal to that of said load arrangement whereby the current drawn thereby from the battery pack at about 75% rated voltage is the same as that drawn by said load arrangement;
   a test switch operable to couple said solenoid across the battery pack;
   a magnetic reed switch coaxial with said solenoid;
   an indicator lamp connected to be energized from the battery pack by said magnetic reed switch; and
   means for establishing the longitudinal location of said solenoid relative to said magnetic reed switch so that about 75% rated voltage of the battery pack will result in ampere-turns sufficient to operate said magnetic reed switch and energize said lamp to provide an indication of acceptable battery condition.

References Cited by the Examiner

UNITED STATES PATENTS

| | | | |
|---|---|---|---|
| 350,160 | 10/1886 | See. | |
| 1,397,247 | 11/1921 | Fitzgerald | 324—29.5 |
| 2,337,612 | 12/1943 | Linder | 331—64 |
| 2,577,602 | 12/1951 | Burton | 317—157 |
| 2,991,413 | 7/1961 | Taylor | 340—249 X |
| 3,124,670 | 4/1964 | Rose | 200—87 |

OTHER REFERENCES

IBM Tech. Discl. Bulletin; Red Switch by F. J. Soychak; vol. 5, No. 3, August 1962, page 41.

NEIL C. READ, *Primary Examiner.*

D. K. MYER, *Assistant Examiner.*